No. 695,935. Patented Mar. 25, 1902.
M. JEWELL.
ATTACHMENT FOR HORSE RAKES.
(Application filed Nov. 11, 1901.)

(No Model.)

Witnesses.
William J. Gale
D. F. Corzer

Inventor.
Martin Jewell
by S. W. Bates
his atty.

UNITED STATES PATENT OFFICE.

MARTIN JEWELL, OF CLINTON, MAINE.

ATTACHMENT FOR HORSE-RAKES.

SPECIFICATION forming part of Letters Patent No. 695,935, dated March 25, 1902.

Application filed November 11, 1901. Serial No. 81,332. (No model.)

*To all whom it may concern:*

Be it known that I, MARTIN JEWELL, a citizen of the United States of America, and a resident of Clinton, Kennebec county, State of Maine, have invented certain new and useful Improvements in Attachments for Horse-Rakes, of which the following is a specification.

My invention relates to an improvement in horse hay-rakes of that class known as "self-dumping" rakes, wherein the rake-head is automatically raised and dumped by the motion of the wheels. In this class of rakes when the load is dumped the rake is allowed to drop of its own weight back to the ground, and it frequently happens that the teeth stick into the ground and either stop the horse or interfere with the smooth operation of the rake.

The object of my present invention is to devise an attachment adapted to be applied to any of the rakes of this class, whereby after dumping the rake may be gradually and gently lowered to the ground. I effect this purpose by means of a ratchet-wheel frictionally pivoted to the body of the rake and adapted to be engaged by a suitable pawl pivoted to the rake-head, so that as the head is raised the pawl will move forward and engage one of the teeth of the ratchet and when the rake is dropped the friction on the ratchet-wheel will allow the pawl to slowly settle back, lowering the rake to the ground.

I illustrate my invention by means of the accompanying drawings, in which—

Figure 1:
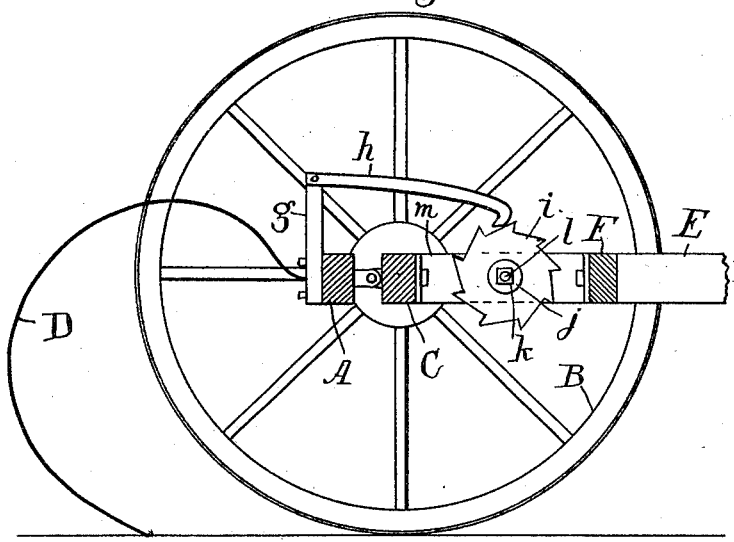
Figure 2:
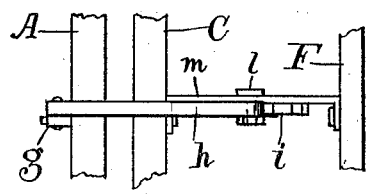

Figure 1 represents a vertical section through a horse-rake, showing my attachment in place; and Fig. 2 is a plan view of a portion of the same, showing the attachment.

C represents the axle of the rake; E, the shafts; B, the wheels; A, the rake-head, and D the teeth. These parts are all common to rakes of this class and need no further description.

To the body of the rake I pivot a ratchet-wheel $i$ with a friction device, by which it may be made to turn with greater or less difficulty. As here shown, I pivot the ratchet-wheel to a flat bar $m$, secured between the axle and the cross-bar F. The bolt $l$ pivots the wheel to the bar, and I have shown a nut $k$ and a friction-disk $j$ for adjusting the tension, although the device will work successfully without the latter. I pivot a pawl to the rake-head adapted to catch the teeth of the ratchet-wheel when the rake-head is lifted and to retard its descent. As here shown, the pawl $h$ is in the form of a hook and is pivoted to the upper end of an arm $g$, secured to the rake-head. The pawl $h$ is in such a position that when the rake-head is raised sufficiently to dump the load the pawl will move forward to catch one of the teeth of the ratchet-wheel, and when the rake settles back after dumping the load the friction on the wheel will retard it, according to the tension of the ratchet-wheel. It will thus be seen that the rake-head when it is dropped will be lowered gradually to the ground without any jar after each load is dumped.

I have here shown a pawl in the form of a hook; but it is obvious that a pawl of different shape may be used and also that it may be otherwise pivoted to the rake.

It will be understood that the mechanism here shown is independent of the ordinary self-dumping mechanism with which these rakes are provided, and it is also evident that the tension of the ratchet-wheel may be varied by the nut to allow the rake to descend with greater or less speed.

It is evident that other friction means than those here shown may be used to retard the downward motion of the rake, the essential feature of the invention being the application of a friction device for retarding the downward motion of the rake after the same has been dropped by the lifting mechanism.

I claim—

1. In a horse hay-rake the combination of a ratchet-wheel pivoted to the body of the rake, means for applying friction to said wheel and a pawl pivoted to the rake-head adapted to engage said ratchet.

2. In a horse hay-rake the combination of a ratchet-wheel pivoted to the body of the rake, means for applying friction to said wheel an arm secured to the rake-head, a pawl pivoted to said arm and adapted to engage said wheel.

Signed at Clinton, Maine, this 28th day of October, 1901.

MARTIN JEWELL.

Witnesses:
FLORA L. LANGLEY,
CLARA JEWELL.